Jan. 26, 1943.  A. R. BULLOCK  2,309,163
METHOD OF MOTOR CONTROL AND APPARATUS THEREFOR
Filed Feb. 1, 1941  3 Sheets-Sheet 1
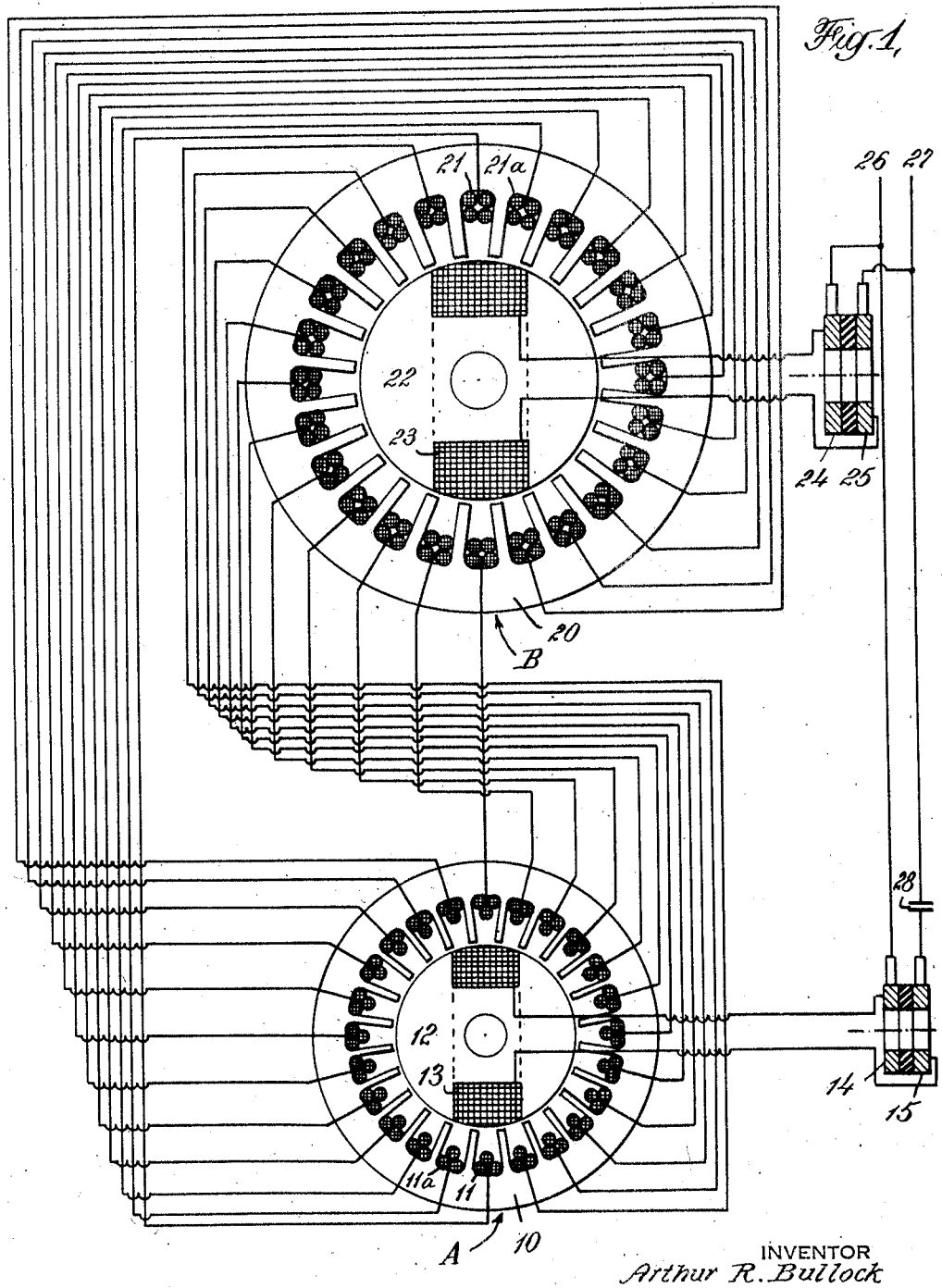
Fig. 1,
INVENTOR
Arthur R. Bullock
BY
Marshall & Hawley
ATTORNEYS

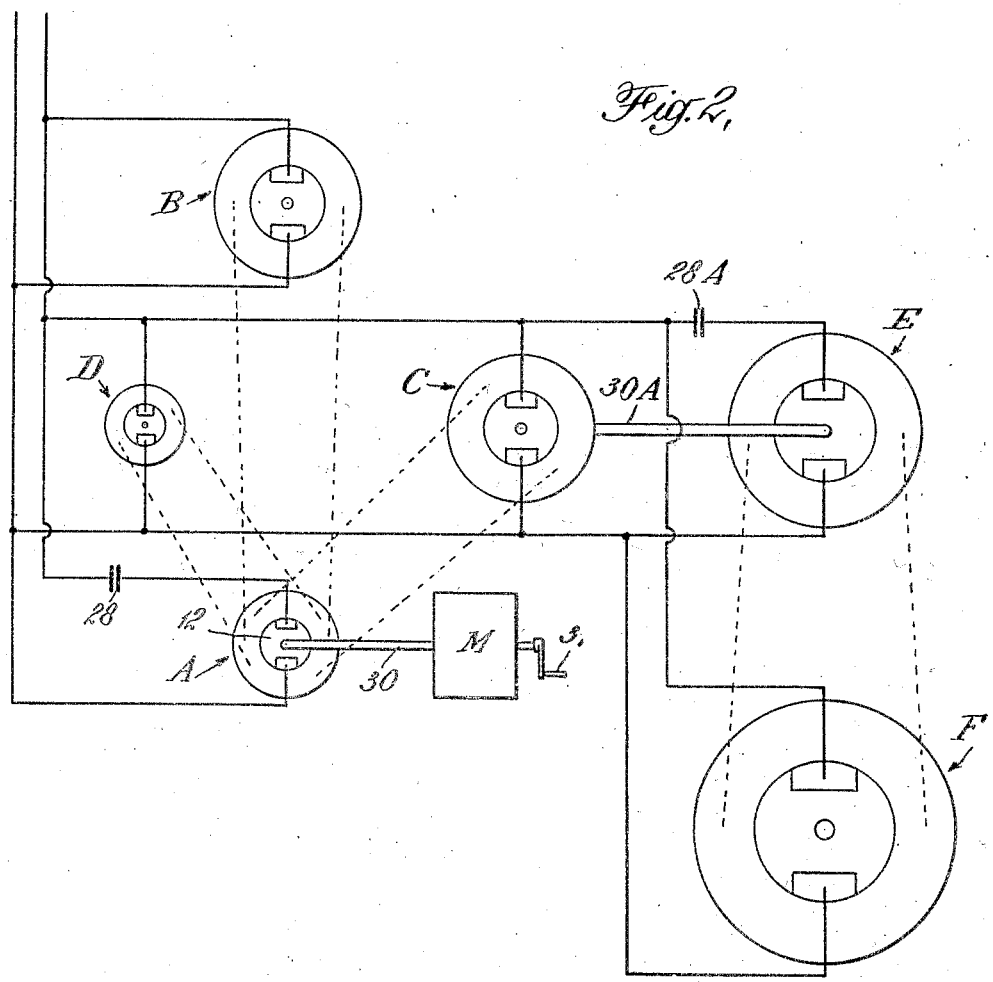

Jan. 26, 1943. A. R. BULLOCK 2,309,163
METHOD OF MOTOR CONTROL AND APPARATUS THEREFOR
Filed Feb. 1, 1941 3 Sheets-Sheet 3
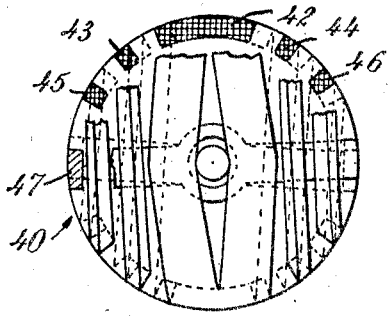
Fig. 3,
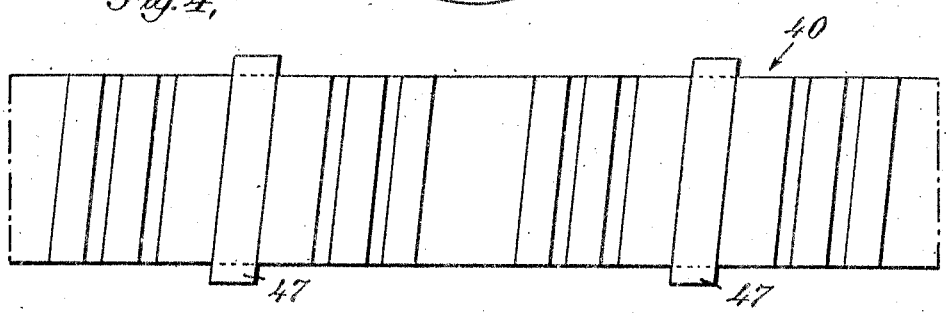
Fig. 4,
Fig. 5, 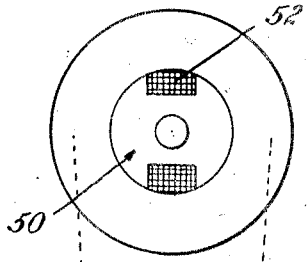
Fig. 6, 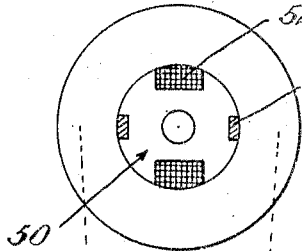
Fig. 7, 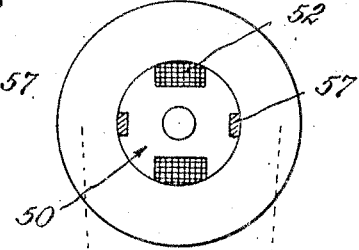
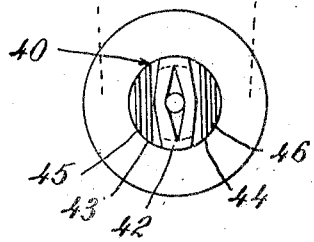 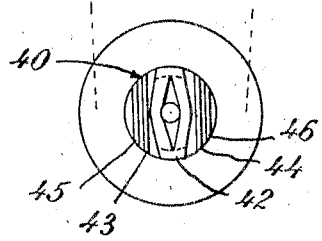 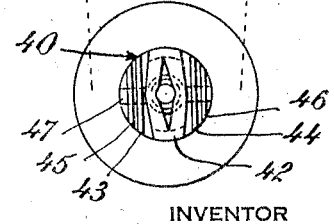
INVENTOR
Arthur R. Bullock
BY
Marshall & Hawley
ATTORNEYS Patented Jan. 26, 1943

2,309,163

UNITED STATES PATENT OFFICE 2,309,163

METHOD OF MOTOR CONTROL AND APPARATUS THEREFOR

Arthur R. Bullock, Elizabeth, N. J., assignor, by mesne assignments, to Essex Engineering Corporation, Short Hills, N. J., a corporation of New Jersey Application February 1, 1941, Serial No. 376,979

15 Claims. (Cl. 172—239)

This invention relates to improvements in methods of motor control and apparatus therefore, and its object is to provide a simple and inexpensive method by which the position and rate of movement of the rotor or rotors of one or more electro-dynamic machines is controlled from that of another electro-dynamic machine in a more efficient manner than has been possible heretofore.

Another object is to provide a system wherein the position and rate of movement of the rotor of one of such machines is transmitted to the rotor or rotors of another or other machines with a substantially uniform torque regardless of the rate of movement of the rotors and with a high power factor.

A further object is to provide a simple arrangement for producing electro-dynamic amplification of power.

The invention also relates to apparatus for carrying out the method herein disclosed.

These and other objects of the invention will appear from the following specification in which I will describe several embodiments of the invention, the novel features of which will be set forth in appended claims.

Referring to the drawings,

Fig. 1 is a diagrammatic representation of a pair of by-polar electro-dynamic units, circuits and associated parts combined in a novel manner to form an embodiment of my invention;

Fig. 2 is a diagrammatic representation of a plurality of interconnected electro-dynamic machines illustrating some of the applications of this invention;

Fig. 3 is an end view of a modified form of rotor with parts broken away which may be used in one of the electro-dynamic machines;

Fig. 4 is a development of the rotor shown in Fig. 3;

Figs. 5, 6 and 7 illustrate different arrangements of pairs of unlike rotors.

In Fig. 1, 10 and 20 designate stators of two electro-dynamic units A and B each having, as shown in this figure, the same number of coil slots. A coil is disposed in each pair of diametrically opposed slots. Each coil in stator 10 is connected with a similarly positioned coil in stator 20: for example, coil 11 in stator 10 is connected with coil 21 in stator 20, coil 11a is connected with coil 21a, etc. It is obvious that one like end of each of the coils in stator 10 may be connected by a common return wire to similar or opposite ends of the coils in stator 20.

12 and 22 are rotors respectively associated with the stators 10 and 20. 13 and 23 are the windings on the rotors 12 and 22 connected respectively with collector rings 14, 15 and 24, 25. A conductor 26 from a suitable source of electric supply is connected with brushes bearing on rings 14 and 24. Another conductor 27 is connected with brushes bearing on rings 15 and 25.

In the specific arrangement illustrated in Fig. 1, a capacitor 28 is interposed between the conductor 27 and the ring 15 for a purpose which will appear hereinafter.

Before describing the arrangements illustrated in the other figures I will point out the operation of that shown in Fig. 1. When an alternating current is applied to the winding 13 of the rotor 12, a magnetic field is built up. The magnetic flux of this field will pass through the rotor and the stator. This flux passes through the stator coils 11, 11a, etc., in different amounts, according to their position relative to that of the winding 13 and this flux sets up currents in the stator coils of varying amounts. As the stator coils 11 are connected with stator coils 21 in the manner heretofore described, these currents will pass through the stator coils 21, etc., in the same angular directions and in the same amount in the similarly disposed coils of both stators. As a result, a composite magnetic flux pattern will be formed in stator 20 which substantially corresponds to that which is formed in stator 10.

If the same alternating current is now applied to the winding 23 on rotor 22, the rotors 12 and 22 will move automatically to parallel angular positions in which the effects resulting from the currents in the coils of both stators are balanced. Thereafter any angular change in the position of either rotor will be simultaneously accompanied by a similar change in the position of the other rotor. The same holds true of any number of electrodynamic machines which are interconnected in the same manner. Such an arrangement may be used for the transmission of angular position or rotation.

By impressing a leading current into winding 13, which may be accomplished by inserting a capacitor 28 in one of the leads 26 or 27, the ultimate result will be materially changed. The reactance value of the circuit comprising the winding 13 and the capacitor 28 is made to have the proper relation to the inductance value of the winding 23 by proportioning the relative values of the capacitor 28 and of the winding 23 so that the electro-dynamic machine A forms, when static, a transformer in which currents are set up inductively in the coils 11, etc. and transferred to the coils 21, etc., and their phase relations are such as to produce a motor field in stator 20 adapted to cooperate with the winding 23 to produce balanced torques in opposite directions which hold the rotor 22 in a fixed relation to the rotor 12.

Upon angular movement of the rotor 12 the cutting of the coils 11 by the magnetic flux generates additional currents which are superimposed upon the induced currents flowing through the coils 11 and the coils 21 and cause the magnetic field of stator 20 to rotate. Consequently, the field pattern of stator 20 will move or rotate in either direction in synchronism with the angular movement of the field pattern in stator 10.

When current from the lines 26, 27 is applied to the winding 23 a motor action will be set up between the field of stator 20 and the rotor 22 due to the cooperative phase relation existing between the flux of the field of stator 20 and the current in coil 23 under the influence of the proper reactance values of the circuit comprising coil 13 and capacitor 28, which have been obtained in the manner previously described.

Any angular movement of the rotor 12 in either direction or the rotation thereof at various speeds, which may be made with relatively little power, will be reproduced on rotor 22 with considerable increase of power. The torque varies with the lead of currents in A (and flowing through the stator coils 11, 21, etc.) which determines the phase positions of the flux set up in stator B and its relation with the flux in rotor 22.

The actions just described are motor effects in which an energized conductor is acted upon by a magnetic field. Therefore, it is needful to transmit from A to B only the small amount of energy required to maintain the revoluble magnetic field because the bulk of the motor energy is taken into the rotor (which functions as an armature), directly from the power line. Thus, a purely electro-dynamic amplification is obtained in which a relatively small amount of energy may be used to produce and control large dynamic effects.

In practice the number of turns of wire in the coil of the stator of the unit B may be greater than those in the stator of the unit A to compensate for certain losses and for the adjustment of inductance values.

In Fig. 2 means are presented diagrammatically for adjusting the angular position or rotating the rotor of the transmitter A. In this figure 30 designates a shaft to which the rotor 12 is affixed. 31 is a crank by which the shaft may be angularly adjusted and M is a variable speed motor for rotating the shaft. C represents a receiving unit like B and D a unit of the same kind but smaller. The connections between the power lines 26, 27 and the units A, B, C, D are shown by solid lines and the interconnections between the stator coils of the transmitter A and similar coils of the receiving units B, C, D are represented by dotted lines.

Any movement of the rotor of the transmitter A will be synchronously reproduced in the rotors of the receiving units B, C and D.

In this Fig. 2 the rotor of the receiving unit C is shown mechanically connected with a unit E by a shaft 30A. F is a larger unit with its stator coils interconnected with those of the unit E. As the unit E is a transmitting unit mechanically driven by the receiving unit C, a leading current is supplied to it by interposing a capacitor 28A in one of the power lines leading to it.

With the arrangement shown the rotors of all of the units will follow synchronously any movement imparted to the rotor of the transmitter unit A, with amplified power. The rate of movement or of rotation of the rotors of the receiving units is a factor of that of the transmitting unit and is not dependent upon the cyclage of the power line. It is understood, of course, that the rotor coils of any of the receiving units may be grouped in the well known manner to make their stators multipolar, in which case the movement imparted to their rotors will be reduced but remain in ratio to that of the rotor of the transmitter rotor.

The desired leading current in the transmitter or transmitters may be obtained by other means than the interposition of capacitors in one of the power lines, as shown. For example, the phase of the current supplied to the transmitter may be advanced by mechanical means, such as supplying it from a generator driven by a synchronous motor and offsetting or advancing the coupling connection between such generator and motor.

In Fig. 3, 40 designates a rotor having a main winding 42 and side coils 43, 44 and 45, 46. Such a rotor will produce a different flux pattern in the stators and a better distribution of the flux. The windings and coils in this rotor may be skewed, as shown by the development of the rotor in Fig. 4. For the sake of clarity, the windings have been omitted in this figure. The skew lessens the abruptness of the flux movement between the rotor and the stator teeth and is desirable for precision operation.

In Figs. 3 and 4, 41 designates a bar which forms a closed conductive ring at right angles to the windings and coils. When this is used in the rotor of a transmitter unit it increases the stability of the flux pattern formed in its stator. When such a bar is used in the rotor of a receiver unit it tends to maintain true synchronism between such a rotor and the field of the stator with which it is used.

The rotors 40 of Figs. 5, 6 and 7 are provided with main windings 42 and side coils 43, 44, 45 and 46. In Fig. 5 the transmitter unit 40 is used with a receiver rotor 50 which has only a main winding 52.

In Fig. 6 the rotor of the transmitter unit is the same as that in Fig. 5, but the rotor of the receiver unit with which it is used has a main winding 52 and a closed conductive ring 57 at right angles to it.

In Fig. 7 the rotor of the transmitter unit 40 has, in addition to the main winding and the side coils, a closed conductive ring 47 at right angles to the winding and coils. The transmitter unit in this Fig. 7 is used with a receiver motor like that in Fig. 6; that is, one having a main winding 52 and a closed conductive ring 57. The rotor windings, side coils and closed conductive rings in all of these units may be skewed as shown in Fig. 4.

Many modifications of the specific embodiments of this invention which have been described may be made within its spirit and scope and I intend no limitations other than those imposed by the appended claims.

What I claim is:

1. A pair of electro-dynamic units each comprising a rotor having a winding and an associated stator, a plurality of independent angularly spaced looped conductors in the stator of each unit in a predetermined position and sequence, corresponding stator conductors of said units being interconnected, connections between the rotor winding of each unit and an alternating current power line, and means for producing a leading current in the entire winding of one of said rotors.

2. A pair of electro-dynamic units each comprising a rotor having a winding and an associated stator, a plurality of independent angularly spaced looped conductors in the stator of each unit in a predetermined position and sequence, corresponding stator conductors of said units being interconnected, connections between the rotor winding of each unit and an alternating current power line, and a capacitor in one of the connections between the power line and the entire winding of one of said rotors.

3. A pair of electro-dynamic units each comprising a rotor having a winding and an associated stator, a plurality of independent angularly spaced looped conductors in the stator of each unit in a predetermined position and sequence, each conductor of the stator of one unit being connected with a like conductor of the stator of the other unit, connections between the rotor of each unit and an alternating current power line, and means for producing a leading current in the entire winding of one of said rotors.

4. A pair of electro-dynamic units each comprising a rotor having a main winding and an associated stator, one of said rotors having additional side coils, a plurality of independent angularly spaced looped conductors in the stator of each unit in a predetermined position and sequence, corresponding stator conductors of said units being interconnected, and connections between the rotor windings of each unit and alternating currents of unlike phase relations.

5. A pair of electro-dynamic units each comprising a rotor having a skewed main winding and an associated stator, one of said rotors having additional skewed side coils, a plurality of independent angularly spaced looped conductors in the stator of each unit in a predetermined position and sequence, corresponding stator conductors of said units being interconnected, and connections between the rotor windings of each unit and an alternating current power line.

6. A pair of electro-dynamic units each comprising a rotor having a skewed main winding and an associated stator, one of said rotors having additional skewed side coils and a closed conductive loop normal to its winding and side coils, a plurality of independent angularly spaced looped conductors in the stator of each unit in a predetermined position and sequence, corresponding stator conductors of said units being interconnected, and connections between the rotor windings of each unit and an alternating current power line.

7. A pair of electro-dynamic units each comprising a rotor having a main winding and a closed conductive loop normal to its winding and side coils and an associated stator, a plurality of independent angularly spaced looped conductors in the stator of each unit in a predetermined position and sequence, corresponding stator conductors of said units being interconnected, connections between the rotor windings of each unit and a single phase alternating current power line, and means for producing a leading current in the winding of one of said rotors.

8. A pair of electro-dynamic units each comprising a rotor having a main winding and a closed conductive loop normal to its winding and side coils and an associated stator, one of said rotors having additional skewed side coils, a plurality of independent angularly spaced looped conductors in the stator of each unit in a predetermined position and sequence, corresponding stator conductors of said units being interconnected, and connections between the rotor winding of each unit and an alternating current power line.

9. A pair of electro-dynamic units each comprising a rotor having a main skewed winding and a closed conductive loop normal to its winding and side coils and an associated stator, one of said rotors having additional skewed side coils, a plurality of independent angularly spaced looped conductors in the stator of each unit in a predetermined position and sequence, corresponding stator conductors of said units being interconnected, and connections between the rotor winding of each unit and an alternating current power line.

10. A pair of electro-dynamic units each comprising a rotor having a main winding and an associated stator, one of said rotors having additional side coils, a plurality of independent angularly spaced looped conductors in the stationary element of each unit in a predetermined position and sequence, corresponding conductors of said units being interconnected, connections between the movable element of each unit and an alternating current power line, and means for producing a leading current in the winding of one of said rotors.

11. A pair of electro-dynamic units each comprising a rotor having a skewed main winding and an associated stator, one of said rotors having additional skewed side coils, a plurality of independent angularly spaced looped conductors in the stator of each unit in a predetermined position and sequence, corresponding stator conductors of said units being interconnected, connections between the rotor winding of each unit and an alternating current power line, and means for producing a leading current in the winding of one of said rotors.

12. A pair of electro-dynamic units each comprising a rotor having a skewed main winding and an associated stator, one of said rotors having additional skewed side coils and a closed conductive loop normal to its winding and side coils, a plurality of independent angularly spaced looped conductors in the stator of each unit in a predetermined position and sequence, corresponding stator conductors of said units being interconnected, connections between the rotor winding of each unit and an alternating current power line, and means for producing a leading current in the winding of one of said rotors.

13. A pair of electro-dynamic units each comprising a rotor having a main winding and a closed conductive loop normal to its winding and side coils and an associated stator, a plurality of independent angularly spaced looped conductors in the stator of each unit in a predetermined position and sequence, corresponding stator conductors of said units being interconnected, connections between the rotor winding of each unit and an alternating current power line, and means for producing a leading current in the winding of one of said rotors.

14. A pair of electro-dynamic units each comprising a rotor having a main winding and a closed conductive loop normal to its winding and side coils and an associated stator, one of said rotors having additional skewed side coils, a plurality of independent angularly spaced looped conductors in the stator of each unit in a predetermined position and sequence, corresponding stator conductors of said units being interconnected, connections between the rotor winding of each unit and an alternating current power line, and a capacitor in one of the connections between the power line and the winding of one of the rotors.

15. A pair of electro-dynamic units each comprising a rotor having a main skewed winding and a closed conductive loop normal to its winding and side coils and an associated stator, one of said rotors having additional skewed side coils, a plurality of independent angularly spaced looped conductors in the stator of each unit in a predetermined position and sequence, corresponding stator conductors of said units being interconnected, connections between the rotor winding of each unit and an alternating current power line, and a capacitor in one of the connections between the power line and the winding of one of the rotors.

ARTHUR R. BULLOCK.